United States Patent
Krallis et al.

(10) Patent No.: US 12,290,803 B2
(45) Date of Patent: *May 6, 2025

(54) PROCESS AND A MULTI-STAGE REACTOR ASSEMBLY FOR THE PRODUCTION OF POLYOLEFINS

(71) Applicant: Borealis AG, Vienna (AT)

(72) Inventors: Apostolos Krallis, Porvoo (FI); Vasileios Kanellopoulos, Linz (AT); Erno Elovainio, Porvoo (FI); Klaus Nyfors, Linz (AT); Joana Kettner, Linz (AT)

(73) Assignee: BOREALIS AG, Vienna (AT)

( * ) Notice: Subject to any disclaimer, the term of this patent is extended or adjusted under 35 U.S.C. 154(b) by 650 days.

This patent is subject to a terminal disclaimer.

(21) Appl. No.: 17/616,433

(22) PCT Filed: Apr. 6, 2020

(86) PCT No.: PCT/EP2020/059810
§ 371 (c)(1),
(2) Date: Dec. 3, 2021

(87) PCT Pub. No.: WO2020/244833
PCT Pub. Date: Dec. 10, 2020

(65) Prior Publication Data
US 2022/0234021 A1    Jul. 28, 2022

(30) Foreign Application Priority Data
Jun. 4, 2019 (EP) .................. 19178245

(51) Int. Cl.
*C08F 10/02*   (2006.01)
*B01J 8/08*    (2006.01)
(Continued)

(52) U.S. Cl.
CPC . *B01J 8/24* (2013.01); *B01J 8/08* (2013.01); *B01J 8/1827* (2013.01); *B01J 8/1854* (2013.01);
(Continued)

(58) Field of Classification Search
CPC ..... C08F 2/001; C08F 2/01; B01J 8/24; B01J 8/08; B01J 8/18
See application file for complete search history.

(56) References Cited

U.S. PATENT DOCUMENTS 9,192,905 B2 * 11/2015 Eriksson .............. B01J 19/2465
9,382,359 B2 *  7/2016 Kanellopoulos ...... C08F 210/16
(Continued)

FOREIGN PATENT DOCUMENTS

CN     107303478 A    10/2017
EP      3231506 A1    10/2017
(Continued)

OTHER PUBLICATIONS

International Search Report dated Jul. 24, 2020 in PCT/EP2020/059810.
(Continued)

*Primary Examiner* — Rip A Lee
(74) *Attorney, Agent, or Firm* — Lippes Mathias LLP

(57) ABSTRACT

A process for the production of polyolefins comprising: feeding a slurry comprising at least one polymerization catalyst, at least one carrier liquid, first olefin monomer(s) and optionally at least one first comonomer into at least one loop reactor; polymerizing the first olefin monomer(s) and optionally the at least one first comonomer yielding a first polyolefin; withdrawing the first polyolefin from the loop reactor; feeding the first polyolefin to a gas-solids olefin polymerization reactor, wherein the gas-solids olefin polymerization reactor comprises: a top zone; a middle zone, (Continued)

Fig. 2a    Fig. 2b

Gas-solid bubbling gas-solids olefin polymerization reactors according to the present invention including jet gas injection means.

which comprises a top end in direct contact with said top zone and which is located below said top zone, the middle zone having a generally cylindrical shape; and a bottom zone, which is in direct contact with a bottom end of the middle zone and which is located below the middle zone; introducing a fluidization gas stream into the bottom zone of the gas-solids olefin polymerization reactor; polymerizing second olefin monomer(s) and optionally at least one second comonomer in the presence of the polymerization catalyst and the first polyolefin to a second polyolefin in a dense phase formed by particles of said second polyolefin suspended in an upwards flowing stream of the fluidization gas in the middle zone; introducing a jet gas stream through one or more jet gas feeding ports in a jet gas feeding area of the middle zone at the dense phase in the middle zone of the gas-solids olefin polymerization reactor; withdrawing the second polyolefin from the gas-solids olefin polymerization reactor.

12 Claims, 3 Drawing Sheets

(51) Int. Cl.
| | | |
|---|---|---|
| *B01J 8/18* | (2006.01) | |
| *B01J 8/24* | (2006.01) | |
| *B01J 19/24* | (2006.01) | |
| *C07F 3/02* | (2006.01) | |
| *C07F 7/28* | (2006.01) | |
| *C08F 2/00* | (2006.01) | |
| *C08F 2/01* | (2006.01) | |
| *C08F 210/06* | (2006.01) | |

(52) U.S. Cl.
CPC ............ *B01J 19/2435* (2013.01); *C07F 3/02* (2013.01); *C07F 7/28* (2013.01); *C08F 2/001* (2013.01); *C08F 2/01* (2013.01); *C08F 210/06* (2013.01); *B01J 2219/1943* (2013.01); *C08F 10/02* (2013.01)

(56) References Cited

U.S. PATENT DOCUMENTS

| | | | |
|---|---|---|---|
| 9,539,556 B2 * | 1/2017 | Al-Haj Ali | C08F 10/00 |
| 9,790,290 B2 * | 10/2017 | Kanellopoulos | C08F 2/01 |
| 10,450,391 B2 * | 10/2019 | Kanellopoulos | B01J 8/0055 |
| 11,208,507 B2 * | 12/2021 | Krallis | B01J 8/24 |
| 11,220,558 B2 * | 1/2022 | Kanellopoulos | C08F 2/01 |
| 11,400,429 B2 * | 8/2022 | Weickert | C08F 10/06 |
| 11,559,776 B2 * | 1/2023 | Weickert | B01J 8/44 |
| 2006/0052552 A1 | 3/2006 | Vuorikari et al. | |
| 2011/0020563 A1 | 1/2011 | Jiang et al. | |
| 2011/0206563 A1 | 8/2011 | Wyatt et al. | |
| 2022/0177616 A1 * | 6/2022 | Weickert | B01J 19/1812 |

FOREIGN PATENT DOCUMENTS

| | | |
|---|---|---|
| EP | 3486260 A1 | 5/2019 |
| FR | 2805178 A1 | 8/2001 |
| KR | 20130008022 A | 7/2014 |
| WO | WO 2019/096557 A1 | 5/2019 |

OTHER PUBLICATIONS

United Arab Emirates Ministry of Economy Search Report Application: P60021892021.

* cited by examiner

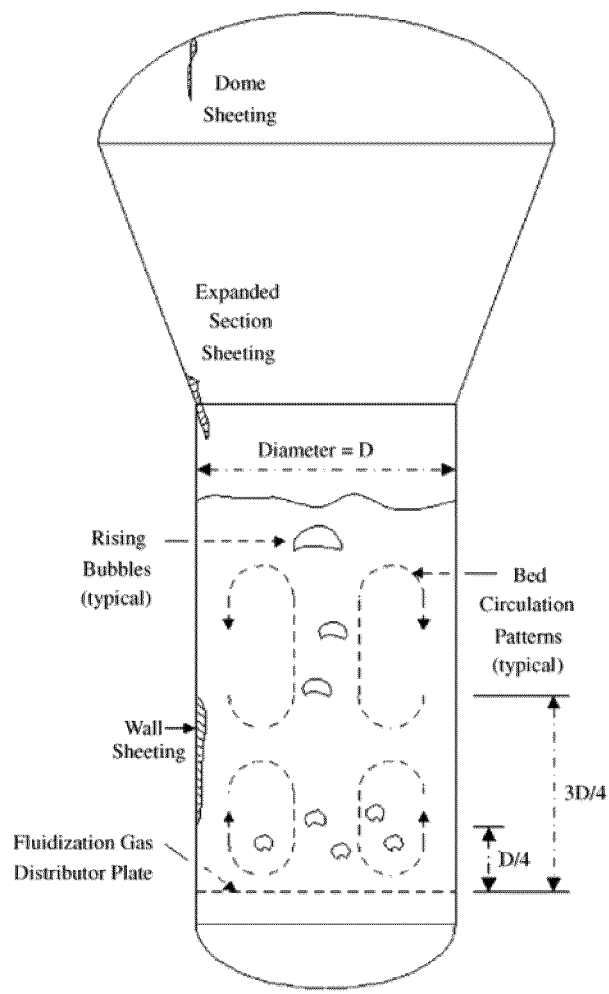
Figure 1: Typical mixing pattern in conventional gas-solid bubbling gas-solids olefin polymerization reactors

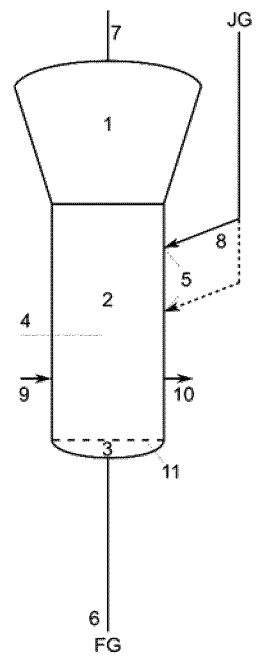
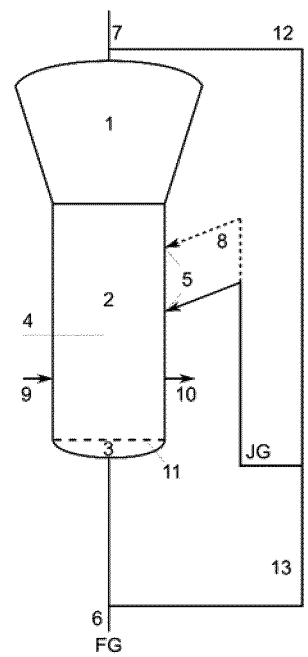
Figure 2: Gas-solid bubbling gas-solids olefin polymerization reactors according to the present invention including jet gas injection means.
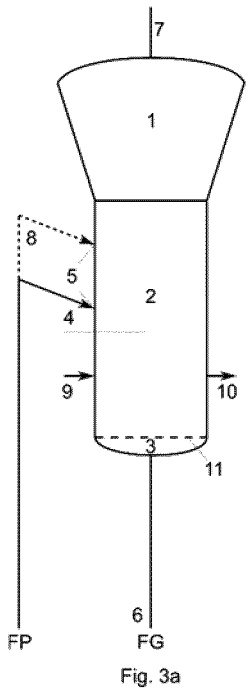
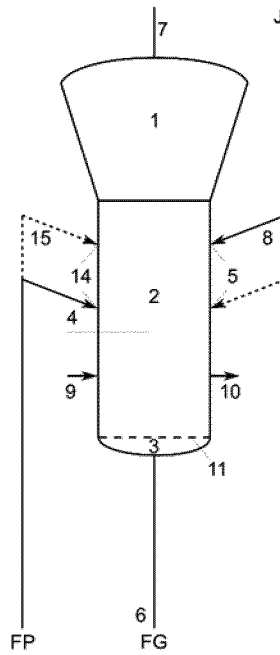
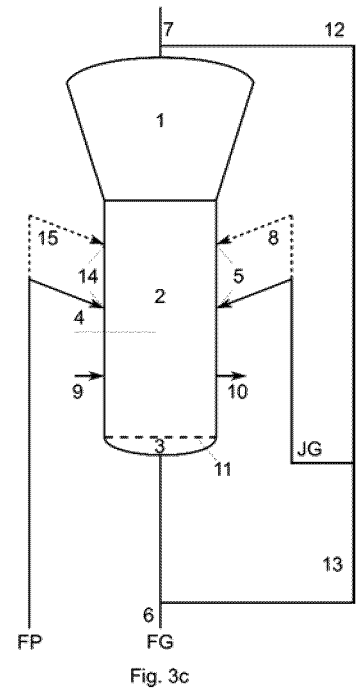
Figure 3: Gas-solid bubbling gas-solids olefin polymerization reactors according to the third preferred embodiment of the present invention including jet gas injection means provided by a flash pipe.

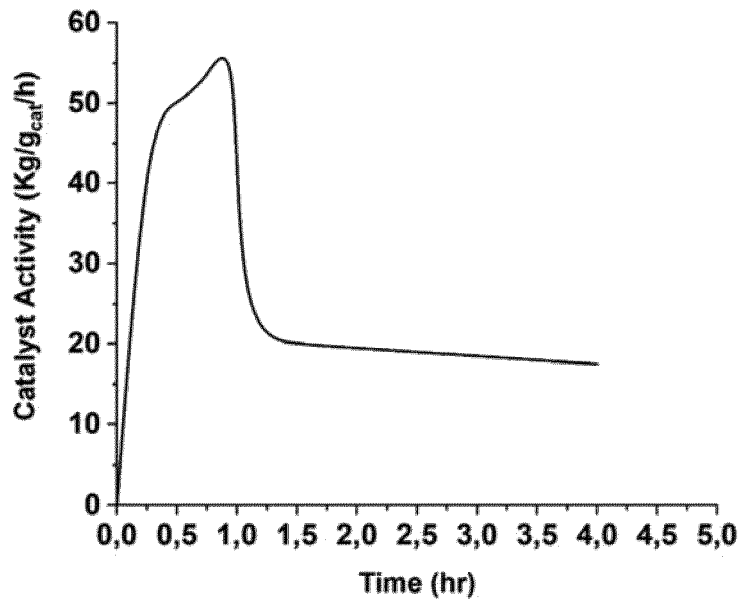
Figure 4: Catalyst activity profile (adapted from the Multi-Modal-Reactor (MMR) data) of the Catalyst A according to Inventive Example IE1.
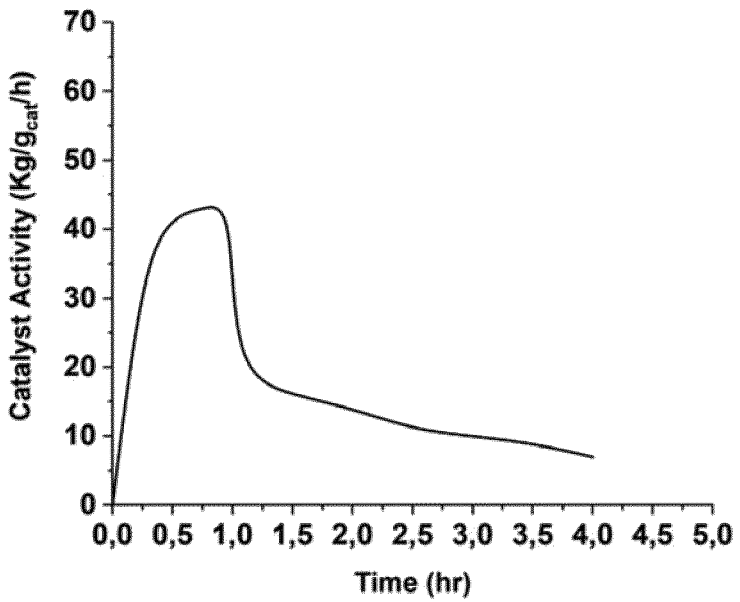
Figure 5: Catalyst activity profile (adapted from the Multi-Modal-Reactor (MMR) data) of the Catalyst B according to Inventive Example IE2.

PROCESS AND A MULTI-STAGE REACTOR ASSEMBLY FOR THE PRODUCTION OF POLYOLEFINS

This is a 371 of PCT Application No. PCT/EP2020/059810, filed Apr. 6, 2020, which claims the benefit of European Application No. 19178245.7, filed Jun. 4, 2019, the contents of which are incorporated herein in their entirety.

The present invention is directed to the polymerization of olefins in a multi-stage reactor assembly comprising at least one loop reactor and at least one gas-solids olefin polymerization reactor.

BACKGROUND

Typical production processes for polyolefins use multi-stage reactor configurations. Such configurations open access to multi-modal polyolefins with specifically tailored mechanical properties. In such configurations, typically a combination of slurry loop reactor(s) (e.g. a pre-polymerization loop reactor and one or two loop reactors) in series followed by a gas-solids olefin polymerization reactor (e.g. in case of polyethylene production) or up to three gas-solids olefin polymerization reactors (e.g. in case of polypropylene production) is used.

To achieve certain properties of the polyolefin produced in the multi-stage polymerization process, it is important to achieve control of the production split without decreasing the throughput of the multi-stage reactor assembly.

Among others, split control depends on the kinetic profiles of the catalyst. Thus, catalytic systems exhibiting fast decaying activity are in particular susceptible to having production splits favoring the loop reactor(s). Reason are long polymerization times in the reactors preceding the gas-solids olefin polymerization reactor (e.g. at least 1.5 h in the pre-polymerization reactor and loop reactor(s)). Hence, the catalyst activity of catalytic systems exhibiting fast decaying activity is already decreased in multi-stage reactor assemblies before reaching the gas-solids olefin polymerization reactor(s).

Moreover, even in case of catalyst systems having a slow decaying activity (flat catalyst activity profile), control of the production split in multi-stage reactor configurations are generally desired.

Hence, it is a general problem of multi-stage reactor assemblies and processes using these assemblies for the production of polyolefins, in particular in implementations using catalyst systems having fast decaying activity, to find solutions for having control over the production split, in particular achieving higher gas-solids olefin polymerization reactor production splits, without lowering the throughput of the multi-stage reactor assembly.

Commonly used gas-solids olefin polymerization reactors are gas-solids olefin polymerization reactors. Typically, in such reactors the fluidization gas moving upwards through the dense phase, in which the polymerization reaction takes place and the polyolefin particles are polymerized, forms gas bubbles, preferably being created above an optional distribution plate. These bubbles quickly move up towards the top of the reactor, preferably in the center of the bed, thus pushing the powder upwards into the entrainment zone, near to the gas exit. In such reactors a certain mixing regime is developed, based on which the solids follow the so called 'two loop' mixing pattern as depicted in FIG. 1 (G. Hendrickson, '*Electrostatics and gas phase fluidized bed polymerization reactor wall sheeting*', Chemical Engineering Science 61, 2006, 1041-1064).

These bubbles entrain polyolefin solids, mostly powder, into the disengaging zone near to the fluidization gas exit. Such entrained solids might deposit in parts of the production plant placed downstream of the reactor leading to fouling and possible blockage of these components. Hence, the described hydrodynamic pattern as found in conventional gas-solids fluidization bed reactors limits the filling degree of the reactor, as the bed level can only be up to a certain height without significantly increasing entrainment of solids. Furthermore, the average bulk density of the fluidized bed is limited as bubbles are distributed all over the fluidized bed generally limiting the efficiency and productivity of such reactors. Therefore, generally, the reactor productivity is limited by the hydrodynamic pattern as observed in conventional gas-solids gas-solids olefin polymerization reactors.

Furthermore, the relatively low polyolefin powder concentration in the upper reactor zone can lead to stronger adhesion of the reactive powder to the inner reactor wall resulting in generation of wall sheeting and lump formation (cf. FIG. 1).

Moreover, there is a general need in gas-solids olefin polymerization reactor technology related to improvement of mixing efficiency. Improved mixing efficiency improves mass and heat transfer resulting in increased operability, performance and handling of demanding material (i.e. sticky polymer grades or material with poor flowability).

Hence, the limiting step in achieving the production splits in favor of the gas-solids olefin polymerization reactor in a multi-stage reactor configuration process results from limitations associated with gas-solids olefin polymerization reactors productivity. All the above-described effects have also an influence on the production split control.

SUMMARY OF THE INVENTION

It has now surprisingly found out that the production split of a gas-solids olefin polymerization reactor in a multi-stage reactor assembly can be increased without decreasing the reactor throughput by implementing a fluidization effect according to which part of the fluidizing gas, solid, or liquid and/or mixture of them is introduced in the gas-solids olefin polymerization reactor at a point above the distribution plate but below the top end of the reactor cylindrical body (dense phase of the reactor). This stream allows the destruction of axially moving powder fountains and generates strong centrifugal forces to separate gas from solids.

Therefore, the present invention relates to a process for the production of polyolefins comprising:
a) feeding a slurry comprising at least one polymerization catalyst, at least one carrier liquid, first olefin monomer(s) and optionally at least one first comonomer into at least one loop reactor;
b) polymerizing the first olefin monomer(s) and optionally the at least one first comonomer yielding a first polyolefin;
c) withdrawing the first polyolefin from the loop reactor;
d) feeding the first polyolefin to a gas-solids olefin polymerization reactor, wherein the gas-solids olefin polymerization reactor comprises:
   a top zone;
   a middle zone, which comprises a top end in direct contact with said top zone and which is located below said top zone, the middle zone having a generally cylindrical shape; and a bottom zone, which is in direct contact with a bottom end of the middle zone and which is located below the middle zone;

e) introducing a fluidization gas stream into the bottom zone of the gas-solids olefin polymerization reactor;

f) polymerizing second olefin monomer(s) and optionally at least one second comonomer in the presence of the polymerization catalyst and the first polyolefin to a second polyolefin in a dense phase formed by particles of said second polyolefin suspended in an upwards flowing stream of the fluidization gas in the middle zone;

g) introducing a jet gas stream through one or more jet gas feeding ports in a jet gas feeding area of the middle zone at the dense phase in the middle zone of the gas-solids olefin polymerization reactor;

h) withdrawing the second polyolefin from the gas-solids olefin polymerization reactor.

The present invention is also related to a multi-stage reactor assembly for the production of polyolefins comprising:

a) at least one loop reactor, comprising:

at least one inlet for feeding a slurry comprising at least one polymerization catalyst, at least one carrier liquid, first monomer(s) and optionally at least one first comonomer;

at least one outlet for withdrawing the first polyolefin produced in the loop reactor; and b) at least one gas-solids olefin polymerization reactor comprising:

a top zone;

a middle zone, which comprises a top end in direct contact with said top zone and which is located below said top zone, the middle zone (2) having a generally cylindrical shape; and a bottom zone, which is in direct contact with a bottom end of the middle zone and which is located below said middle zone;

one or more jet gas feeding ports located in a jet gas feeding area of the middle zone;

a first line for feeding a fluidization gas stream into the bottom zone of the gas-solids olefin polymerization reactor, a second line for withdrawing a stream comprising fluidization gas from the top zone of the gas-solids olefin polymerization reactor, a third line for introducing a jet gas stream into the middle zone of the gas-solids olefin polymerization reactor via the one or more feeding ports, an inlet connected to the outlet of the at least one loop reactor, for feeding catalyst, polyolefin, monomer and optionally comonomer; and an outlet for withdrawing the second polyolefin produced in the gas-solids olefin polymerization reactor.

Still further, the present invention is related to the use of the process and/or the multi-stage reactor assembly according to the present invention as described above and below for controlling the production split of the gas-solids olefin polymerization reactor, preferably increasing the production split of the gas-solids olefin polymerization reactor.

Furthermore, the present invention is related to the use of the process and/or the multi-stage reactor assembly according to the present invention as described above and below for increasing the bulk density of the dense phase during polymerization and/or reducing the carry-over of particles of the polyolefin of the olefin monomer(s) into the second stream withdrawn from the top zone of the gas-solids olefin polymerization reactor.

DETAILED DESCRIPTION

Definitions

A multi-stage reactor assembly according to the present invention is a system in which an olefin polymer may be produced by polymerization. The assembly comprises at least one loop reactor. The assembly may comprise two or more loop reactors in parallel and/or in series, preferably in series. Further, the assembly comprises one or more gas-solids olefin polymerization reactors and means for further downstream processing, such as means for separating and recovering solid olefin polymer particles. A loop reactor according to the present invention is a closed pipe typically completely filled with slurry in which the slurry is circulated with a high velocity along the pipe by using a circulation pump. Loop reactors are well known in the art and examples are given, for instance, in U.S. Pat. Nos. 4,582,816, 3,405,109, 3,324,093, EP-A-479186 and U.S. Pat. No. 5,391,654. A loop reactor usually comprises vertical segments and horizontal segments, both interconnected by bends or elbows, respectively. Depending on whether a horizontal segment is interconnected via a bend or elbow to an upper end or to a lower end of a vertical segment, the horizontal segment either represents a lower or an upper horizontal segment By fluidization gas is meant the gas comprising monomer, and eventually comonomers, chain transfer agent and inert components which form the upwards flowing gas in the gas-solids olefin polymerization reactor and in which the polymer particles are suspended, e.g. in the fluidized bed of a gas-solids olefin polymerization reactor. The unreacted gas is collected at the top of the reactor, optionally compressed, optionally cooled and optionally returned to the reactor. As it is understood by the person skilled in the art the composition of the fluidization gas is not constant during the cycle. Reactive components are consumed in the reactor and they are added into the circulation line for compensating losses.

A gas-solids olefin polymerization reactor is a polymerization reactor for heterophasic polymerization of gaseous olefin monomer(s) into polyolefin powder particles, which comprises three zones: in the bottom zone the fluidization gas is introduced into the reactor; in the middle zone, which usually has a generally cylindrical shape, the olefin monomer(s) present in the fluidization gas are polymerized to form the polymer particles; in the top zone the fluidization gas is withdrawn from the reactor. In certain types of gas-solids olefin polymerization reactors a fluidization grid (also named distribution plate) separates the bottom zone from the middle zone. In certain types of gas-solids olefin polymerization reactors the top zone forms a disengaging or entrainment zone in which due to its expanding diameter compared to the middle zone the fluidization gas expands and the gas disengages from the polyolefin powder.

The dense phase denotes the area within the middle zone of the gas-solids olefin polymerization reactor with an increased fluidized bulk density due to the formation of the polymer particles. In certain types of gas-solids olefin polymerization reactors, namely gas-solids olefin polymerization reactors, the dense phase is formed by the fluidized bed.

As it is well understood in the art the superficial gas velocity denotes the velocity of the gas in an empty construction. Thus, the superficial gas velocity within the middle zone is the volumetric flow rate of the gas (in m$^3$/s) divided by the cross-sectional area of the middle zone (in m$^2$) and the area occupied by the particles is thus neglected.

"Entrained polyolefin powder" or "carry-over of particles" denotes polyolefin particles which are withdrawn together with the fluidization gas in the second stream of fluidization gas from the top zone of the gas-solids olefin polymerization reactor.

"Circulation gas line" denotes the system of lines or tubes through which the second stream of fluidization gas is reintroduced into the gas-solids olefin polymerization reactor as first stream of fluidization gas and as jet gas stream.

"Bulk density" (or "fluidized bed density" for fluidized bed polymerization reactors) denotes mass of polymer powder divided by the volume of the reactor, excluding the optional disengaging zone.

In the present invention the different streams are measured as volume streams so that also the split of these streams is meant as volume split measured in v/v.

Differences in pressure ΔP are measured in bar if not noted otherwise.

The present text refers to diameter and equivalent diameter. In case of non-spherical objects the equivalent diameter denotes the diameter of a sphere or a circle which has the same volume or area (in case of a circle) as the non-spherical object. It should be understood that even though the present text sometimes refers to diameter, the object in question needs not be spherical unless otherwise specifically mentioned. In case of non-spherical objects (particles or cross-sections) the equivalent diameter is then meant.

Polymerization

The olefin monomer(s) polymerized in the process of the present invention are typically alpha-olefins having from 2 to 12 carbon atoms, preferably from 2 to 10 carbon atoms. Preferably, the olefin monomer(s) are ethylene or propylene, optionally together with one or more other alpha-olefin monomer(s) having from 2 to 8 carbon atoms. Especially preferably the process of the present invention is used for polymerizing ethylene, optionally with one or more comonomers selected from alpha-olefin monomer(s) having from 4 to 8 carbon atoms; or propylene, optionally together with one or more comonomers selected from ethylene and alpha-olefin monomer(s) having from 4 to 8 carbon atoms.

Thus, the polymer material is preferably selected from alpha-olefin homo- or copolymers having alpha-olefin monomer units of from 2 to 12 carbon atoms, preferably from 2 to 10 carbon atoms. Preferred are ethylene or propylene homo- or copolymers. The comonomer units of ethylene copolymers are preferably selected from one or more comonomers selected from alpha-olefin monomer(s) having from 4 to 8 carbon atoms. The comonomer units of propylene copolymers are preferably selected from one or more comonomers selected from ethylene and alpha-olefin monomer(s) having from 4 to 8 carbon atoms.

In one preferred embodiment of the invention, in the method according to the invention a polypropylene homo- or copolymer is polymerized from the olefin monomer(s) and optional comonomer(s). Preferably, in this embodiment, the polymerization is carried out at a temperature of 50-100° C. under a pressure of 15-25 barg. Preferably, the molar ratios of the reactants are adjusted as follows: a $C_2/C_3$ ratio of 0-0.05 mol/mol for random polypropylenes, and a molar $C_2/C_3$ ratio of 0.2-0.7 mol/mol for block polypropylenes. Generally, the $H_2/C_3$ molar ratio in this embodiment is adjusted to 0-0.05 mol/mol. Moreover, in this embodiment, the propylene feed is preferably adjusted to 20-40 t/h, whereby the comonomer feed is 0-15 t/h and hydrogen feed is 1-10 kg/h.

In a second preferred embodiment of the invention, in the method according to the invention a polyethylene homo- or copolymer is polymerized from the olefin monomer(s) and optional comonomer(s). Preferably, in this embodiment, the polymerization is carried out at a temperature of 50-100° C. under a pressure of 15-25 barg. Preferably, the molar ratios of the reactants are adjusted as follows: a $C_4/C_2$ ratio of 0.1-0.8 mol/mol for polyethylene-1-butene copolymers and a $C_6/C_2$ ratio of 0-0.1 mol/mol for polyethylene-1-hexene copolymers. Generally, the $H_2/C_2$ molar ratio in this embodiment is adjusted to 0-0.05 mol/mol. Moreover, in this embodiment, the ethylene feed is preferably adjusted to 15-20 t/h, whereby the comonomer feed is adjusted to 0-20 t/h for 1-butene and to 0-7 t/h for 1-hexene. Preferably, hydrogen feed is 1-100 kg/h and diluent feed (propane): 30-50 t/h.

Polymerization Catalyst

The polymerization in the gas-solids olefin polymerization reactor is conducted in the presence of an olefin polymerization catalyst. The catalyst may be any catalyst which is capable of producing the desired olefin polymer. Suitable catalysts are, among others, Ziegler-Natta catalysts based on a transition metal, such as titanium, zirconium and/or vanadium catalysts. Especially Ziegler-Natta catalysts are useful as they can produce olefin polymers within a wide range of molecular weight with a high productivity.

Catalyst component may be supported on a particulate support, such as inorganic oxide, like silica or alumina, or magnesium halide may form the solid support. The solid catalyst component may also be prepared by emulsion-solidification method or by precipitation method.

Suitable Ziegler-Natta catalysts preferably contain a magnesium compound, a titanium compound, optionally an electron donor (internal electron donor) and optionally an aluminium compound. Suitable internal electron donors are, among others, esters of carboxylic acids or dicarboxylic acids, like phthalates, maleates, substituted maleates, benzoates, and succinates, ethers and diethers or oxygen or nitrogen containing silicon compounds, or mixtures thereof.

The particulate support can be an inorganic oxide support, such as silica, alumina, titania, silica-alumina and silica-titania. Preferably, the support is silica.

Solid Ziegler-Natta catalyst component may be formed without using any external support material, like silica, alumina or separately prepared $MgCl_2$ based solid support, onto which catalyst compounds are loaded. Instead a solid catalyst component is formed by a method where all catalyst compounds are contacted and/or reacted in liquid with each other, and after that the solid catalyst is formed. The solid catalyst component particles are formed via emulsion-solidification or via precipitation method.

In the method, where solid catalyst components are formed via emulsion-solidification method, the dispersed phase in the form of liquid droplets of the emulsion forms the catalyst part, which is transformed to solid catalyst particles during the solidification step, where the morphology is remained.

The average particle size of the catalyst may vary within a broad range, being e.g. in the range of 5 to 500 μm, preferably in the range of 5 to 200 μm. The average particle size of the silica support can be typically from 6 to 100 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contains a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator, also called as cocatalyst. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

Catalyst systems may also contain external electron donors, which include ethers, ketones, amines, alcohols, phenols, phosphines, esters and silanes. Silane type external electron donors are typically organosilane compounds, containing Si—OCOR, Si—OR, and/or Si—$NR_2$ bonds, having silicon as the central atom, and R is an alkyl, alkenyl, aryl, arylalkyl or cycloalkyl with 1-20 carbon atoms as known in the art. Such compounds are described e.g. in U.S. Pat. Nos. 4,472,524, 4,522,930, 4,560,671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Gas-Solids Olefin Polymerization

In the gas-solids olefin polymerization reactor polymerization is conducted using gaseous olefin monomer(s) in which the polymer particles are growing.

The present process is suitable for any kind of gas-solids olefin polymerization reactors suitable for the polymerization of alpha-olefin homo- or copolymers. Suitable reactors are e.g. continuous-stirred tank reactors or gas-solids olefin polymerization reactors. Both types of gas-solids olefin polymerization reactors are well known in the art.

Preferably the gas-solids olefin polymerization reactor is a fluidized bed reactor.

In a fluidized bed reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

Thereby, in one preferred embodiment the fluidized bed reactor can comprise a fluidization grid which is situated below the fluidized bed thereby separating the bottom zone and the middle zone of the reactor. The upper limit of the fluidized bed is usually defined by a disengaging zone in which due to its expanding diameter compared to the middle zone the fluidization gas expands and the gas disengages from the polyolefin powder. Fluidized bed reactors with disengaging zone and fluidization grid are well known in the art. Such a gas-solids olefin polymerization reactor suitable for the process of the present invention is shown in FIGS. 2 and 3.

In another preferred embodiment the fluidized bed reactor does not comprise a fluidization grid. The polymerization takes place in a reactor including a bottom zone, a middle zone and a top zone. The bottom zone, which has a generally conical shape, forms the lower part of the reactor in which the base of the fluidized bed is formed. The base of the bed forms in the bottom zone with no fluidization grid, or gas distribution plate, being present. Above the bottom zone and in direct contact with it is the middle zone, which has a generally cylindrical shape. The middle zone and the upper part of the bottom zone contain the fluidized bed. Because there is no fluidization grid there is a free exchange of gas and particles between the different regions within the bottom zone and between the bottom zone and the middle zone. Finally, above the middle zone and in direct contact therewith is the top zone which has a generally conical shape tapering upwards.

The bottom zone of the reactor has a generally conical shape tapering downwards. Because of the shape of the zone, the gas velocity gradually decreases along the height within said bottom zone. The gas velocity in the lowest part is greater than the transport velocity and the particles eventually contained in the gas are transported upwards with the gas. At a certain height within the bottom zone the gas velocity becomes smaller than the transport velocity and a fluidized bed starts to form. When the gas velocity becomes still smaller the bed becomes denser and the polymer particles distribute the gas over the whole cross-section of the bed. Such a gas-solids olefin polymerization reactor without fluidization grid is described in EP-A-2 495 037 and EP-A-2 495 038.

In a gas-solids olefin polymerization reactor the upwards moving gas stream is established by withdrawing a fluidization gas stream as second gas stream from the top zone of the reactor, typically at the highest location. The second gas stream withdrawn from the reactor is then usually cooled and re-introduced to the bottom zone of the reactor as first stream of fluidization gas. In a preferred embodiment, the fluidization gas of the second gas stream is also compressed in a compressor. More preferably, the compressor is located upstream of the cooler. Preferably, the gas is filtered before being passed to the compressor. Additional olefin monomer (s), eventual comonomer(s), hydrogen and inert gas are suitably introduced into the circulation gas line. It is preferred to analyze the composition of the circulation gas, for instance, by using on-line gas chromatography and adjust the addition of the gas components so that their contents are maintained at desired levels.

The polymerization is generally conducted at a temperature and pressure where the fluidization gas essentially remains in vapour or gas phase. For olefin polymerization the temperature is suitably within the range of 30 to 110° C., preferably 50 to 100° C. The pressure is suitably in the range of 1 to 50 bar, preferably 5 to 35 bar.

In order to remove entrained polyolefin powder, the circulation gas line, i.e. the line for withdrawing the second stream, preferably comprises at least one cyclone. The cyclone has the objective of removing the entrained polymer material from the circulation gas. The polymer stream recovered from the cyclone can be directed to another polymerization stage, or it may be returned into the gas-solids olefin polymerization reactor or it may be withdrawn as the polymer product.

In the case the polymer stream recovered from the cyclone is returned into the gas-solids polymerization reactor the polymer stream is returned through one or more feedings ports, which are different feeding ports as the one or more feeding ports for introducing the jet gas stream into the dense phase in the middle zone of the gas-solids olefin polymerization reactor.

Preferably, the jet gas stream in the third line comprises not more than 5 wt % solid polymer with respect to the total weight of the jet gas stream, more preferably not more than 3 wt % solid polymer, even more preferably not more than 2 wt % solid polymer and most preferably not more than 1 wt % solid polymer.

Ratio of the Kinetic Energy of the Jet Gas Stream and the Fluidization Gas Stream According to a first preferred embodiment of the process and the multi-stage reactor assembly of the present invention the fluidization gas fed in the bottom zone of the reactor is provided with kinetic energy beforehand. Accordingly, also the jet gas stream fed into the dense zone of the reactor via jet gas feeding ports is provided with kinetic energy prior to entry in the reactor. Therefore, preferably, the gas-solids olefin polymerization reactor of the multi-stage reactor assembly according to the present invention comprises means for providing energy to the fluidization gas stream and the jet gas stream, whereby the means for providing kinetic energy to the fluidization gas stream (9) and the means for providing kinetic energy to the jet gas stream (10) are configured so that the kinetic energy ($E_{JG}$) input in the reactor by the jet stream (JG) is between 1.0 and 50 times higher than the kinetic energy ($E_{FG}$) input in the reactor by the fluidization gas stream (FG) as expressed by relation (I)

$$1.0 \leq \frac{E_{JG}}{E_{FG}} \leq 50 \qquad (I)$$

wherein the kinetic energy of the fluidization gas ($E_{FG}$) is calculated according to equation (II):

$$E_{FG} = P_{FG} \cdot V_{FG} \cdot \ln\left(\frac{P_{FG}}{P_{FG} - h \cdot \rho \cdot g}\right) \qquad (II)$$

with $E_{FG}$ being the energy dissipated by the expansion of the fluidisation gas into the fluidized bed, [W]

$P_{FG}$ being the pressure of the fluidisation gas at the bottom of the gas-solids olefin polymerization reactor, [Pa]

$V_{FG}$ being the volumetric flow rate of the fluidisation gas, [m³/s]

h being the bed height of the collapsed bed, [m]

ρ being the bulk density of the collapsed bed, [kg/m³]

g being the gravity constant, [m/s²]

and wherein the kinetic energy of the jet gas ($E_{JG}$) is calculated according to equation (III):

$$E_{JG} = P_{JG} \cdot V_{JG} \cdot \ln\left(\frac{V_{FG2}}{V_{JG}}\right) \qquad (III)$$

with $E_{JG}$ being the energy dissipated by the expansion of the jet gas into the fluidized bed, [W]

$P_{JG}$ being the pressure of the jet gas at entry in the gas-solids olefin polymerization reactor, [Pa]

$V_{FG2}$ being the volumetric flow rate of the fluidisation gas, [m³/s]

$V_{JG}$ being the volumetric flow rate of the jet gas, [m³/s]

Further, the present invention is related to the use of the process and/or the multi-stage reactor assembly according to the present invention as described above and below for reducing the carry-over of particles of the polyolefin of the olefin monomer(s) into the second stream withdrawn from the top zone of the gas-solids olefin polymerization reactor.

More preferably, the kinetic energy ($E_{JG}$) input in the reactor by the jet stream is between 1.5 and 25 times higher than the kinetic energy ($E_{FG}$) input in the reactor by the fluidization gas stream according to relation (IV)

$$1.5 \leq \frac{E_{JG}}{E_{FG}} \leq 25 \quad \text{(IV)}$$

Even more preferably, the kinetic energy ($E_{JG}$) input in the reactor by the jet stream is between 2.0 and 15 times higher than the kinetic energy ($E_{FG}$) input in the reactor by the fluidization gas stream according to relation (V)

$$2.0 \leq \frac{E_{JG}}{E_{FG}} \leq 15 \quad \text{(V)}$$

The means for providing kinetic energy can be any means for providing the gas streams with kinetic energy. Such means comprise blowers, compressors, such as screw compressors, and fans. Preferably, the means are blowers or compressors. More preferably, the means are blowers. In one preferred embodiment, the means for providing kinetic energy to the fluidization gas is at least one blower and the means for providing kinetic energy to the jet gas is at least one screw compressor.

In an particularly preferred embodiment of the invention, the means for providing kinetic energy to the jet gas stream in the third line is a flash pipe of a preceding reactor, preferably a polymerization reactor, more preferably a polypropylene polymerization reactor and most preferably a loop polymerization reactor for polypropylene. In such a case, the jet gas stream can include not only fluidization gas, but a solids-gas mixture as withdrawn from the flash pipe. Hence, preferably, the multi-stage reactor assembly according to the present invention further comprises:
one or more flash pipe feeding ports located in a jet gas feeding area of the middle zone; and
a sixth line for introducing a flash pipe gas stream into the bottom zone of the gas-solids olefin polymerization reactor via the one or more flash pipe feeding ports.

The fluidization gas is withdrawn from the top zone of the reactor in a second line. Preferably, the second line is split into a third line and the first line. The first line is introduced into the bottom zone of the reactor, whereas the third line is introduced into the reactor through one or more feeding ports at a jet gas feeding area of the middle zone into the dense phase in the middle zone of the reactor. Thereby, the stream in the third line is not mixed with particles of the polymer of the olefin monomer(s) before entering the reactor and thus is not introduced into the reactor through feeding ports for reintroducing particles of the polymer of the olefin monomer(s) into the gas-solids olefin polymerization reactor.

Preferably, the jet gas feeding area of the middle zone is located on the surface of the middle zone between the top end and 50% of the total height of the middle zone, whereas the bottom end corresponds to 0% and the top end corresponds to 100% of the total height of the middle zone. More preferably, the jet gas feeding area of the middle zone is located on the surface of the middle zone between the top end and 70% of the total height of the middle zone.

Preferably, the jet gas stream is introduced through the one or more feeding ports into the dense phase in the middle zone of the gas-solids olefin polymerization reactor in an introduction angle α of 5° to 75°, preferably 10° to 65°, most preferably 15° to 60°. The introduction angle is the angle between a projection and a perpendicular line, whereas the projection is the projection of the direction of the jet gas stream after introduction into the reactor on a projection plane, which crosses the tangent plane of the generally cylindrical shape of the middle zone at the location of the one or more feeding ports and along an intersection line between the tangent plane and the generally cylindrical surface of the middle zone, whereas the projection plane is located perpendicular to the tangent plane and whereas the perpendicular line crosses the generally cylindrical surface of the middle zone at the location of the one or more feeding ports, is parallel to the projection plane and is perpendicular to the tangent plane. Most preferably, the optimal introduction angle for introducing the jet gas stream has been found to be about 20°.

The number of feeding ports for introducing the jet gas stream is in the range of preferably 1 to 15, more preferably 2 to 10 and most preferably 2 to 5

The feeding ports are preferably distributed across the middle zone of the gas-solids olefin polymerization reactor in axial and/or radial direction with the proviso that the jet gas stream is introduced into the dense phase.

The second stream is preferably split into the jet gas stream and the first stream of fluidization gas at a ratio of 5:95 (v/v) to 75:25 (v/v), preferably 7:93 (v/v) to 65:35 (v/v), most preferably 10:90 (v/v) to 50:50 (v/v).

Depending on the volume split between the jet gas stream and the first stream of fluidization gas, the jet gas stream has a certain pressure and contributes to the superficial gas velocity of the upwards flowing stream in the middle zone of the reactor.

It is further preferred that the superficial gas velocity of the upwards flowing stream of the fluidization gas in the middle zone of the reactor is from 0.3 to 1.2 m/s, more preferably from 0.4 to 1.0 m/s, most preferably from 0.5 to 0.9 m/s.

The bulk density of the dense phase during polymerization is in the range of from 100 to 500 kg/m³, preferably of from 120 to 470 kg/m³, most preferably of from 150 to 450 kg/m³.

In a preferred embodiment of the invention, the first line and/or the third line comprise heat exchanger. These heat exchangers can be used as heaters and/or as coolers.

Benefits of the Invention

It has been found that in the process of the present invention a higher bulk density of the dense phase can be obtained over the whole polymerization process.

As a consequence with the process of the present invention the gas-solids olefin polymerization reactor can be run under higher space-time yield or volume based production rate increasing the throughput or capacity of the reactor.

Without being bound by theory it is believed that the increase of bulk density results from a reduction of gas bubbles in the bottom and middle zone of the reactor. Without being further bound by theory it is believed that the higher bulk density results in higher residence times of the particles in the reactor at equal throughput rates.

Hence, the increased residence times allow for higher productivity of the gas-solids olefin polymerization reactor allowing for higher production splits of the gas-solids olefin polymerization reactor in comparison to the loop reactor.

Therefore, with the jet gas amount, the residence time of the particles can be adjusted and, hence, the split in the multi-stage reactor assembly.

Further, the axial motion of the polyolefin powder in the top zone of the gas-solids olefin polymerization reactor is disturbed by the feed of the jet gas stream as such that the gaseous (and optional solid) content in the upper part of the middle zone and the top zone of the reactor is permanently accelerated in one direction. The introduced jet gas stream in the third line accelerates the downward flow of polymer solids close to the wall of the middle zone. This effect allows destruction of the axially moving polyolefin powder fountains and contributes to separating gas and solids, with solids moving downwards along the wall, "scraping" the wall permanently such that adhesive powder is washed away and wall sheeting can be suppressed thereby improving the reactor operability.

As a consequence the carry-over of particles of the polyolefin of the olefin monomer(s) into the second stream withdrawn from the top zone of the gas-solids olefin polymerization reactor is reduced thereby increasing the gas-solids separation efficiency and at the same time the cooling capacity of the process is not sacrificed.

SHORT DESCRIPTION OF THE FIGURES

FIG. 1 shows a gas-solids olefin polymerization reactor as known from the prior art.

FIG. 2 shows gas-solids olefin polymerization reactors of a multi-stage reactor assembly according to the present invention having jet injection capabilities.

FIG. 3 shows a gas-solids olefin polymerization reactor of a multi-stage reactor assembly according to the present invention having jet injection capabilities connected to a flash pipe from a preceding polymerization reactor.

FIG. 4 shows the catalyst activity profile of the catalyst used in CE1 and IE1

FIG. 5 shows the catalyst activity profile of the catalyst used in CE2 and IE2

DETAILED DESCRIPTION OF THE FIGURES

FIG. 1 shows a gas-solids olefin polymerization reactor as typically used. Typical hydrodynamic patterns are depicted. Gas bubbles generated by the distribution plate move preferably in the center of the reactor upwards.

These bubbles in the center create a cylindrical hydrodynamic pattern, in which the inner parts of the cylinder move upwards, while the outer parts move downwards. In the lower part of the reactor, where the centralizing of the bubbles has not happened yet, the above-described pattern induces another hydrodynamic pattern, which acts counter wise. As a result, there is a calm zone, in which the solid-gas mixture is not moving very rapidly. In this zone, wall sheeting can occur. Furthermore, as a result of solid entrainment into the disengaging zone, sheeting can also occur further upstream of the reactor middle zone.

FIG. 2 shows the first preferred embodiment of the process according to the present invention in a gas-solids olefin polymerization reactor.

REFERENCE SIGNS 1 top zone (disengaging zone)
2 middle zone
3 bottom zone
4 fluidized bed (dense zone)
5 jet gas feeding port(s)
6 first line (fluidization gas (FG) input)
7 second line (fluidization gas output)
8 third line (jet gas (JG) input)
9 feeding port for polymerization catalyst
10 polymer withdrawal outlet
11 fluidization grid
12 fourth line connecting the third line (8) and the second line (7)
13 fifth line connecting the third line (8) and the first line (6)

Description of FIG. 2

FIG. 2 shows the first preferred embodiment of the gas-solids olefin polymerization reactor system as implemented in the multi-stage reactor assembly of the present invention and as used in the process of the present invention. The gas-solids olefin polymerization comprises a top zone (1), a middle zone (2) and a bottom zone (3). The first line (6) of fluidization gas enters the gas-solids olefin polymerization reactor through the bottom zone (3) and flows upwards, thereby passing a fluidization grid (11) and entering the middle zone (2). Due to the substantially cylindrical shape of the middle zone (2) the gas velocity is constant so that the fluidized bed (4) is established after the fluidization grid (11) in the middle zone (2). Due to the conical shape of the top zone (1) the gas entering the top zone (1) expands so that the gas disengages from the polyolefin product of the polymerization reaction so that the fluidized bed (4) is confined in the middle zone (2) and the lower part of the top zone (1). The polymerization catalyst together with optional polyolefin powder polymerized in previous polymerization stage(s) is introduced into the gas-solids olefin polymerization reactor through at least on feeding port (9) directly into the fluidized bed (4). The polyolefin product of the polymerization process is withdrawn from the gas-solids olefin polymerization reactor through polymer withdrawal outlet (10). The fluidized gas is withdrawn from the top zone (1) as a second line (7) of fluidization gas.

In a particularly preferred embodiment of the invention, the solids-gas reactor according to the present invention (FIG. 2b) further comprises a fourth line (12) connecting the second line (7) and the third line (8) as well as a fifth line (13) connecting the third line (8) and the first line (6). Hence, in this embodiment at least part of the fluidization gas leaving the reactor from the top zone is recycled and reintroduced into the reactor either as fluidization gas or jet gas. The advantage of such an arrangement is that lower amounts of fluidization gas is needed and the overall process is less energy consuming as at least part of the heat as removed with the fluidization gas from the reactor is reintroduced at the bottom or via the jet gas feeds reducing the amount of energy needed to bring the gas streams to the temperature as needed for the reaction on the reactor.

FIG. 3 shows another embodiment of the process according to the present invention in a gas-solids olefin polymerization reactor.

REFERENCE SIGNS

The reference signs 1-13 are identical to FIG. 2.
14 flash pipe jet gas feeding port(s)
15 sixth line connecting a flash pipe (FB) to reactor via feeding port(s) 14.
FP flash pipe from a preceding polymerization reactor Description of FIG. 3

As can be seen in FIGS. 3a-c, in this preferred embodiment of the present invention, either the whole jet gas injection system is completely replaced by a solids-gas stream derived from a flash pipe (FP, 5, 8; FIG. 3a) or at least one jet stream is derived from a flash pipe (FP, 14, 15, FIG. 3b-c) in addition to the jet stream as already described in the embodiments of FIG. 2 (JG, 5, 8; FIG. 2a-b). Further combinations can be implemented, e.g. a reactor assembly having flash pipe jet gas input and fluidization gas recirculation without the jet gas injection as described in the embodiments of FIG. 2 (i.e. line 8 via port(s) 5).

The stream derived from a flash pipe of a preceding polymerization reaction, preferably a polymerization reactor for the polymerization of polypropylene, most preferably a loop polymerization reactor for the polymerization of polypropylene, has a very high energy (momentum). Hence, the resulting jet gas stream has also much higher energy than the jet gas stream as provided by the fluidization gas. The technical effect of such an embodiment is that the hydrodynamic pattern as found in typical gas-solids olefin polymerization reactors (i.e. without jet gas injection) can be more efficiently destroyed yielding an increase in bulk density at reduced solids carry-over.

Examples

Preparation of Catalyst A

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst A and its preparation concept is described in general e.g. in EP 0 491 566, EP 0 591 224 and EP 0 586 390.
Preparation of Catalyst B
Raw Materials (Catalyst B)
  $TiCl_4$ (CAS 7550-45-90)
  20% solution in toluene of butyl ethyl magnesium (Mg (Bu)(Et)), provided by Crompton
  2-ethylhexanol, provided by Merck Chemicals
  3-Butoxy-2-propanol, provided by Sigma-Aldrich
  bis(2-ethylhexyl)citraconate, provided by Contract Chemicals
  Viscoplex® 1-254, provided by Evonik
  Heptane, provided by Chevron Preparation of Mg Complex (Catalyst B)

3.4 l of 2-ethylhexanol and 810 ml of propylene glycol butyl monoether (in a molar ratio 4/1) were added to a 20 l reactor. Then 7.8 l of a 20% solution in toluene of BEM (butyl ethyl magnesium) provided by Crompton GmbH was slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to storage vessel.

21.2 g of Mg-alkoxide as prepared above was mixed with 4.0 ml bis(2-ethylhexyl) citraconate for 5 min. After mixing the obtained Mg complex was used immediately in the preparation of catalyst component.
Preparation of Catalyst Component (Catalyst B)

19.5 ml titanium tetrachloride was placed in a 300 ml reactor equipped with a mechanical stirrer at 25° C. Mixing speed was adjusted to 170 rpm. 26.0 g of Mg-complex as prepared above was added within 30 minutes keeping the temperature at 25° C. 3.0 ml of Viscoplex 1-254 and 24.0 ml of heptane were added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed with 100 ml of toluene, with of 30 ml of $TiCl_4$, with 100 ml of toluene and two times with 60 ml of heptane. 1 ml of donor was added to the two first washings. Washings were made at 80° C. under stirring for 30 min with 170 rpm. After stirring was stopped the reaction mixture was allowed to settle for 20-30 minutes and followed by siphoning.

Afterwards stirring was stopped and the reaction mixture was allowed to settle for 10 minutes the temperature was decreased to 70° C. with subsequent siphoning, and followed by $N_2$ sparging for 20 minutes to yield an air sensitive powder.

Catalyst B has a surface area measured by BET method below 5 $m^2/g$, i.e. below the detection limit.

Comparative Example 1 (CE1)

A Ziegler Natta polypropylene (ZNPP) catalyst (Catalyst A) exhibiting a kinetic profile as shown in FIG. 4 was used. The catalyst was slurried in a carrier liquid, co-catalyst and donor, hydrogen, and propylene and subsequently fed into a pre-polymerizer.

The pre-polymerizer was operated at a pressure of 58 barg and a temperature of 30° C. The material introduced into the pre-polymerized had a mean residence time of 30 min. The produced pre-polymer was fed with additional propylene and hydrogen for molecular weight control to the slurry loop reactor.

The reaction took place in bulk propylene as a carrier liquid. The loop reactor was operated at a temperature of 80° C. and a pressure of 56 barg, whereby the slurry concentration was around 45 wt %.

Subsequently, the slurry from the loop reactor was fed directly to the first gas solid olefin polymerization reactor to produce further homopolypropylene. This reactor was operated at a temperature of 85° C. and a pressure of 22 barg.

After withdrawal from the first gas solid olefin polymerization reactor, the material was transferred to the second first gas solid olefin polymerization reactor to produce homopolymer/random copolymer.

The overall residence time in the gas solid olefin polymerization reactors connected in series was 2 h and 15 min. The production split was 51/49 (i.e., 51 wt % of the polymer was produced in the loop reactor and 49 wt % of the polymer was produced in first gas solid olefin polymerization reactors).

Inventive Example 1 (IE1)

In Inventive Example 1, the polymerization series described in Comparative Example 1 was repeated with the only difference being the introduction of jet gas in the first gas solid olefin polymerization reactors. While the fluidization bed volume and the production rate of the first gas solid olefin polymerization reactors was kept constant according to Comparative Example 1, the production split was 43.5/56.5 (i.e., 43.5 wt % of the polymer was produced in the loop reactor and 56.5 wt % of the polymer was produced in the gas solid olefin polymerization reactors).

Comparative Example 2 (CE2)

In Comparative Example 2, the polymerization series described in Comparative Example 1 was repeated with the only difference being the catalyst system used. In this example, a Ziegler Natta polypropylene (ZNPP) catalyst (Catalyst B) exhibiting a kinetic profile shown in FIG. 5 was used. The production split was 60/40 (i.e., 60 wt % of the polymer was produced in the loop reactor and 40 wt % of the polymer was produced in the gas solid olefin polymerization reactors).

Inventive Example 2 (IE2)

In Inventive Example 2, the polymerization series described in Comparative Example 2 was repeated with the only difference being the introduction of jet gas in the gas solid olefin polymerization reactors. While the fluidization bed volume and the production rate of the first gas solid olefin polymerization reactors was kept constant according to Comparative Example 2, the production split was 49.3/56.5 (i.e., 49.3 wt % of the polymer was produced in the loop reactor and 56.5 wt % of the polymer was produced in the gas solid olefin polymerization reactors).

The invention claimed is:

1. A process for the production of polyolefins comprising:
   a) feeding a slurry comprising at least one polymerization catalyst, at least one carrier liquid, first olefin monomer(s) and optionally at least one first comonomer into at least one loop reactor;
   b) polymerizing the first olefin monomer(s) and optionally the at least one first comonomer yielding a first polyolefin;
   c) withdrawing the first polyolefin from the at least one loop reactor;
   d) feeding the first polyolefin to at least one gas-solids olefin polymerization reactor, wherein the at least one gas-solids olefin polymerization reactor comprises:
   a top zone (1);
   a middle zone (2), which comprises a top end in direct contact with said top zone and which is located below said top zone (1), the middle zone (2) having a generally cylindrical shape; and
   a bottom zone (3), which is in direct contact with a bottom end of the middle zone (2) and which is located below the middle zone (2);
   e) introducing a fluidization gas (FG) stream into the bottom zone (3) of the at least one gas-solids olefin polymerization reactor;
   f) polymerizing second olefin monomer(s) and optionally at least one second comonomer in the presence of the at least one polymerization catalyst and the first polyolefin to a second polyolefin in a dense zone (4) formed by particles of said second polyolefin suspended in an upward flowing stream of fluidization gas in the middle zone (2);
   g) introducing a jet gas (JG) stream through one or more jet gas feeding ports (5) in a jet gas feeding area of the middle zone (2) at the dense zone (4) in the middle zone (2) of the at least one gas-solids olefin polymerization reactor;
   h) withdrawing the second polyolefin from the at least one gas-solids olefin polymerization reactor;
   wherein the jet gas (JG) stream fed through at least one of the one or more jet gas feeding ports (5) is provided by a flash pipe (FP) from the at least one loop reactor.

2. The process according to claim 1, wherein the fluidization gas is removed from the top zone (1) of the at least one gas-solids olefin polymerization reactor and at least a part of the fluidization gas is introduced into the jet gas (JG) stream and into the fluidization gas (FG) stream.

3. A multi-stage reactor assembly for the production of polyolefins comprising
   a) at least one loop reactor, comprising:
   at least one inlet for feeding a slurry comprising at least one polymerization catalyst, at least one carrier liquid, first monomer(s) and optionally at least one first comonomer;
   at least one outlet for withdrawing a first polyolefin produced in the at least one loop reactor; and
   b) at least one gas-solids olefin polymerization reactor comprising:
   a top zone (1);
   a middle zone (2), which comprises a top end in direct contact with said top zone (1) and which is located below said top zone (1), the middle zone (2) having a generally cylindrical shape; and
   a bottom zone (3), which is in direct contact with a bottom end of the middle zone (2) and which is located below said middle zone (2);
   one or more jet gas feeding ports (5) located in a jet gas feeding area of the middle zone (2);
   a first line (6) for feeding a fluidization gas (FG) stream into the bottom zone (3) of the at least one gas-solids olefin polymerization reactor,
   a second line (7) for withdrawing a stream comprising fluidization gas from the top zone (1) of the at least one gas-solids olefin polymerization reactor,
   a third line (8) for introducing a jet gas (JG) stream into the middle zone (2) of the at least one gas-solids olefin polymerization reactor via the one or more feeding ports (5), wherein the jet gas (JG) stream fed through at least one of the one or more jet gas feeding ports (5) is provided by a flash pipe (FP) from the loop reactor;
   a feeding port (9) connected to the at least one outlet of the at least one loop reactor, for feeding catalyst, polyolefin, monomer and optionally comonomer; and
   a polymer withdrawal outlet (10) for withdrawing a second polyolefin produced in the at least one gas-solids olefin polymerization reactor;
   one or more flash pipe jet gas feeding ports (14) located in a jet gas feeding area of the middle zone (2); and a sixth line (15) for introducing a flash pipe (FP) gas stream into the middle zone (2) of the at least one gas-solids olefin polymerization reactor via the one or more flash pipe jet gas feeding ports (14).

4. The process of claim 1, wherein carry-over of particles of polyolefin into a second stream comprising fluidization gas withdrawn from the top zone (1) of the at least one gas-solids olefin polymerization reactor is reduced.

5. The process of claim 1, wherein a split between the first polyolefin produced in the at least one loop reactor and the second polyolefin produced in the at least one gas-solids olefin polymerization reactor is adjusted.

6. The process of claim 1, wherein a bulk density of the dense zone is increased during polymerization.

7. The process of claim 2, wherein carry-over of particles of polyolefin into a second stream comprising fluidization gas withdrawn from the top zone of the at least one gas-solids olefin polymerization reactor is reduced.

8. The multi-stage reactor assembly of claim 3, wherein carry-over of particles of polyolefin into the stream withdrawn from the top zone of the at least one gas-solids olefin polymerization reactor is reduced.

9. The process of claim 2, wherein a split between the first polyolefin produced in the at least one loop reactor and the second polyolefin produced in the at least one gas-solids olefin polymerization reactor is adjusted.

10. The multi-stage reactor assembly of claim 3, wherein a split between the first polyolefin produced in the at least one loop reactor and the second polyolefin produced in the at least one gas-solids olefin polymerization reactor is adjusted.

11. The process of claim 2, wherein a bulk density of the dense zone is increased during polymerization.

12. The process of claim 1, wherein the at least one loop reactor is a loop reactor for polymerizing polypropylene.

* * * * *